United States Patent
Townsend et al.

(10) Patent No.: US 10,564,739 B2
(45) Date of Patent: *Feb. 18, 2020

(54) POINTER UNIFICATION (71) Applicant: MICROSOFT TECHNOLOGY LICENSING, LLC, Redmond, WA (US)

(72) Inventors: Reed Townsend, Kirkland, WA (US); Mariel Young, Seattle, WA (US); Joyce Wu, Redmond, WA (US); Krishnan Menon, Redmond, WA (US); Olumuyiwa Durojaiye, Bothell, WA (US); Uros Batricevic, Redmond, WA (US); Vipul Aneja, Redmond, WA (US); Todd Torset, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 613 days.

This patent is subject to a terminal disclaimer.

(21) Appl. No.: 15/245,132

(22) Filed: Aug. 23, 2016

(65) Prior Publication Data
US 2016/0370878 A1 Dec. 22, 2016

Related U.S. Application Data (63) Continuation of application No. 13/615,272, filed on Sep. 13, 2012, now Pat. No. 9,483,155.

(51) Int. Cl.
*G06F 3/00* (2006.01)
*G06F 3/038* (2013.01)
(Continued)

(52) U.S. Cl.
CPC .......... *G06F 3/038* (2013.01); *G06F 3/03543* (2013.01); *G06F 3/0416* (2013.01);
(Continued)

(58) Field of Classification Search
CPC ..................................................... G06F 3/0416
(Continued)

(56) References Cited

U.S. PATENT DOCUMENTS 5,694,150 A 12/1997 Sigona et al.
2006/0267957 A1 11/2006 Kolmykov-Zotov et al.
2012/0023460 A1 1/2012 Blumenberg

OTHER PUBLICATIONS

"Non-Final Office Action Issued in U.S. Appl. No. 13/615,272", dated Feb. 12, 2016, 11 Pages.
(Continued)

*Primary Examiner* — Andrey Belousov (57) ABSTRACT

Embodiments relate to a computing device having storage, a processor, a display, a first human input device, and a second human input device, where the first human input device is in a first category of human input devices and the second human input device is in a second category of human input devices. The computing device may perform a process involving executing a windowing environment that manages windows of applications executing on the computing device. The windowing environment may receive raw inputs from the first and second human input devices and in turn generate input pointers for the raw inputs, respectively. The input pointers may be or include instances of an input pointer class implemented by the windowing environment, the pointer class used by the windowing environment for arbitrary different types of human input pointer devices including the first human input device and the second human input device.

20 Claims, 7 Drawing Sheets (51) Int. Cl.
  *G06F 3/0481* (2013.01)
  *G06F 9/451* (2018.01)
  *G06F 3/0354* (2013.01)
  *G06F 3/041* (2006.01)

(52) U.S. Cl.
  CPC ............ *G06F 3/0481* (2013.01); *G06F 9/451* (2018.02); *G06F 2203/04104* (2013.01)

(58) Field of Classification Search
  USPC .................................................. 715/781, 856
  See application file for complete search history.

(56) References Cited

OTHER PUBLICATIONS

"Notice of Allowance Issued in U.S. Appl. No. 13/615,272", dated Jul. 13, 2016, 6 Pages.

Fukuchi, et al., "An Evaluation of Multiple Pointing Input Systems", In Proceedings of the IFIP INTERACT: Human-Computer Interaction, Jul. 9, 2001, pp. 739-740.

Micelli, et al., "Design of Gestural Interfaces for Simulated Smart Environments", In Adjunct Proceedings of 3rd European Conference on Ambient Intelligence, Nov. 2009, pp. 231-234.

Townsend, et al., "Build Advanced Touch Apps in Windows 8—APP-186T", Microsoft Corporation, APP-186T, Sep. 15, 2011, 46 Pages.

Westerman, Wayne, "Hand Tracking, Finger Identification, and Chordic Manipulation on a Multi-Touch Surface", A Dissertation Submitted for the Partial Fulfillment of the Degree of Doctor of Philosophy, University of Delaware, May 1999, 363 Pages.

Pointer Class  142

| Properties | Description |
|---|---|
| [get/set] Device(IPointerDevice) | The associated pointer device |
| [get/set] Point(point) | The location of the point |
| [get/set] PointerId(DWORD32) | The id for this pointer |
| [get/set] PointerFrameId(DWORD32) | The frame id containing this pointer |
| [get/set] Timestamp(DWORD32 *value) | The timestamp associated with this pointer |
| [get/set] InContact(boolean) | Whether the pointer is in contact with the screen |
| [get/set] IsFirstButtonPressed(boolean) | Whether the first pointer button is pressed |
| [get/set] IsSecondButtonPressed(boolean) | Whether the second pointer button is pressed |
| [get/set] IsPrimary(boolean) | Whether the pointer is primary |
| [get/set] IsInRange(boolean) | Whether the pointer is is range of the device |
| [get/set] IsFirstInRange(boolean) | Whether the pointer is newly detected |

| Methods | Description |
|---|---|
| HasProperty(PointerDevicePropertyIdentifier, bool) | Determines if a specified property exists on a pointer |
| GetPropertyValue(PointerDevicePropertyIdentifier, INT32) | Retrieves the specified property for a pointer |
| GetPropertyContactRect(Rect*) | Retrieves the contact rect |
| GetPropertyPressure(float*) | Retrieves the pointer pressure |
| GetPropertyOrientation(float*) | Retrieves the contact orientation |
| GetPropertyTwist(float*) | Retrieves the pointer twist (rotation of the barrel along the barrel axis for a pen) |
| GetPropertyTiltX(float*) | Retrieves the pointer Y tilt |
| GetPropertyTiltY(float*) | Returns the PointerDevicePropertyIdentifier for y location |

FIG. 5    Gesture Class  144

| Methods | Description |
| --- | --- |
| ProcessDown(IVector<PointerPoints>) | Processes pointer data from a pointer down message and associated history |
| ProcessMove(IVector<PointerPoints>) | Processes pointer data from a move message and associated history |
| ProcessUp(IVector<PointerPoints>) | Processes pointer data from an up message and associated history |
| ProcessInertia(time) | Processes inertia |
| ProcessMouseWheel(IVector<PointerPoints>) | Processes mouse wheel data |
| CompleteGesture() | Completes the current gesture and resets to not active |

| Properties | Description |
| --- | --- |
| [get/set] GestureSettings(GestureSettings) | Gesture configuration settings |
| [get] IsInertial(boolean) | Reports whether the gesture processor is current in an inertia state |
| [get] IsActive(boolean) | Reports if the GestureProcessor is current processing a gesture or inertia |
| [get/set] ShowGestureFeedback(boolean) | Enable/disable DWM gesture feedback for detected gestures |
| [get/set] PivotPoint(point) | Pivot point for single-finger rotation |
| [get/set] PivotRadius(double) | Pivot radius for single-finger rotation |
| various inertial-related properties | e.g., expansion, deceleration, translation, expansion, rotation angle, inertia expansion, etc. |
| [get/set] CrossSlideThresholds(crossslidethresholds) | Set/get the cross-slide gesture thresholds |
| [get/set] CrossSlideHorizontally(bool) | Set/get the axis upon which cross-slide functions. |

| Events | Description |
| --- | --- |
| Tap | tap has occurred |
| Hold | a pointer dwelled for a period of time |
| Drag | a drag ocurred |
| Manipulation | a manipulation occurred (e.g., an affine transform such as scale, translate, rotate, post-input inertial affine transform, etc.) |
| others | e.g, PressAndTap, ManipulationStarted, ManipulationUpdated, ManipulationIntertiaStarting, ManipulationInertiaComleted, CrossSlide, Toss, etc. |

PointerDevice Class 144

| Properties | Description |
| --- | --- |
| [get] Type(POINTER_DEVICE_TYPE) | Reports the pointer device type |
| [get] IsExternal(bool) | Reports if the pointer device is external or integrated |
| [get] MaxTouchContacts(UINT32) | Reports the maximum number of contacts a touch device supports |
| [get] SupportedProperties(IVectorView< PointerDeviceProperty>) | Retrieves the set of raw HID properties associated with this pointer |

PointerDevices Static Class 144A

| Methods | Description |
| --- | --- |
| GetPointerDevices(IVector<IPointerDevice> **devices) | Returns the list of pointer devices |
| GetPointerDevice(pointerID, IPointerDevice **device) | Returns the pointer device associated with a pointer id |
| ... | ... |

POINTER UNIFICATION

RELATED APPLICATION

This application is a continuation patent application of copending application Ser. No. 13/615,272, filed Sep. 13, 2012, entitled "POINTER UNIFICATION", which is now allowed. The aforementioned application(s) are hereby incorporated herein by reference.

BACKGROUND

The Human Interface Device (HID) standard is a protocol that allows human-operated input devices to send data to a host computer. HID is flexible regarding what information devices are allowed to report. Pointer devices (e.g., mice, pens, touch digitizers, etc.) all report x-y coordinates, but depending on the device, data such as pressure, tilt and contact geometry may or may not be reported. In addition, HID allows devices to report custom properties, effectively allowing them to include any arbitrary information. The fact that certain data may or may not be present makes it challenging for developers to write software that supports these devices. Often, a developer must write different sections of code to support different types of devices.

In addition, developers must contend with different user interface frameworks that use different coordinate systems which may be relative to the physical screen, the application window, UI elements within the window, or other reference frames. Keeping track of a variety of coordinate systems is tedious, and forces developers to write code differently based on the UI framework being used.

In addition, when performing gesture recognition, most gesture recognizers work on a full set of inputs. It has not been possible for a developer to code for basic gesture detection at the contact level without sacrificing the use of system-provided gesture recognition.

Finally, legacy applications may expect traditional mouse messages. Such applications may not expect device-neutral pointer messages containing mouse data; there has not been any way to support these applications while at the same time providing a mechanism that transforms generic pointer data into legacy mouse data in an efficient way.

Discussed below are techniques related to providing unified access to inputs (pointers) from pointer devices such as mice, touch surfaces, pens, or other input devices that allow a user to "point" in two or three dimensions.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to a computing device having storage, a processor, a display, a first human input device, and a second human input device, where the first human input device is in a first category of human input devices and the second human input device is in a second category of human input devices. The computing device may perform a process involving executing a windowing environment that manages windows of applications executing on the computing device. The windowing environment may receive raw inputs from the first and second human input devices and in turn generate input pointers for the raw inputs, respectively. The input pointers may be or include instances of an input pointer class implemented by the windowing environment, the pointer class used by the windowing environment for arbitrary different types of human input pointer devices including the first human input device and the second human input device.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows an example gesture class.

DETAILED DESCRIPTION

Embodiments discussed below relate to unified handling of pointer devices in a windowing environment. Discussion will begin with an overview of an example prior approach and limitations thereof. A windowing environment that allows applications to handle pointing devices and their inputs in a unified manner is then described, followed by discussion of example implementations.

Figure 1:
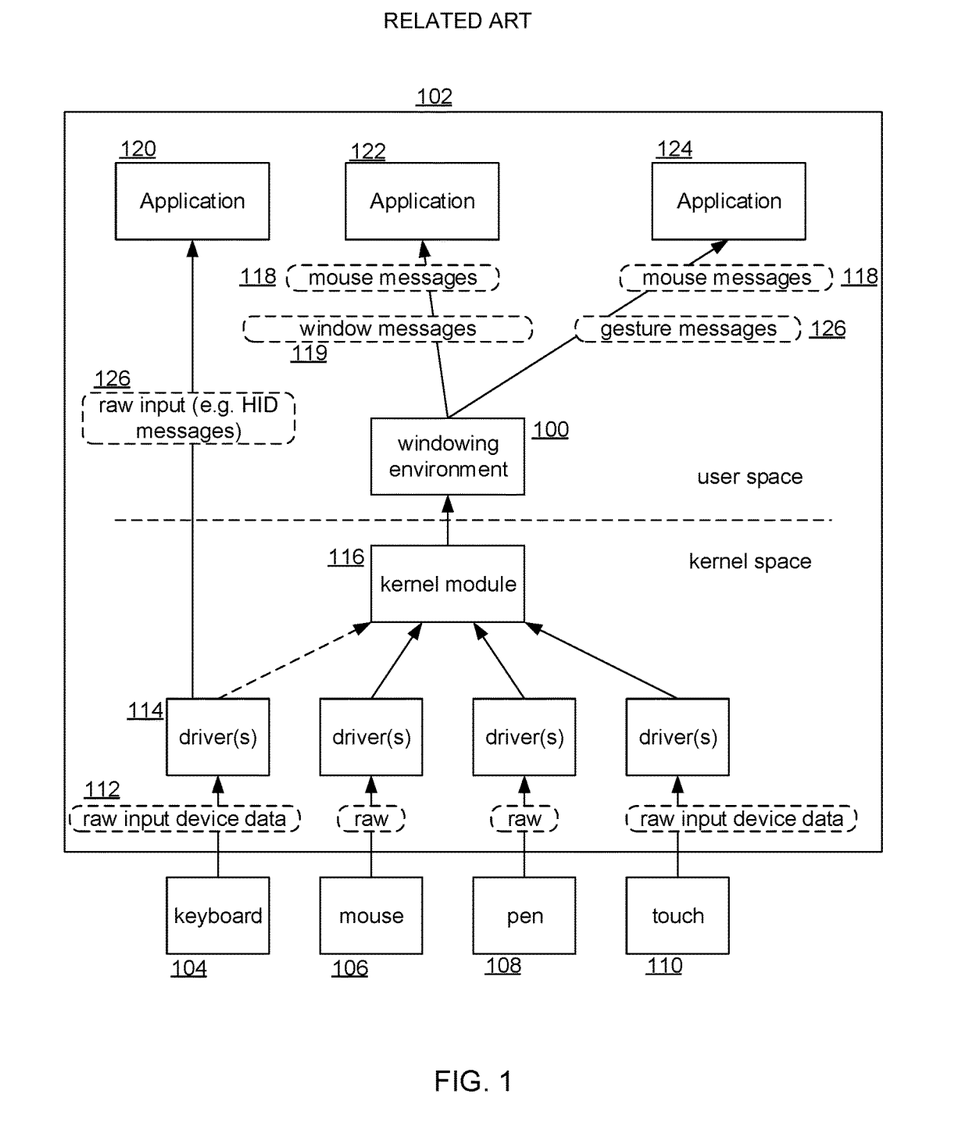
FIG. 1 shows a prior windowing environment on a computing device.

FIG. 1 shows a prior windowing environment 100 on a computing device 102. The windowing environment 100 may be any of a number of well-known windowing systems such as Microsoft Windows™), Apple OSX™, The X Window System, and others. Note that different operating systems may not have a kernel-user space distinction as shown in FIG. 1. The windowing environment 100 typically manages windows, sends window events to applications, handles input events from a human input device, and other functions well known in windowing environments for arbitrary applications.

The windowing environment 100 also may handle inputs from human input devices such as a keyboard 104, a mouse 106, a pen 108, a touch device 110, or any other human-operated input device. Of particular note are pointer-type input devices by which a user can specify arbitrary two or three-dimensional input points and other inputs. Input devices 104, 106, 108, 110 may pass raw input device data 112 up through respective driver stacks 114 to a kernel module 116, which may in turn pass input data to the windowing environment 100 which decides which applications to notify about which inputs or input-activated events.

The windowing environment 100 treats each input device as a separate and distinct data type. That is, the windowing environment 100 may have a different set of data types and interfaces for each type of input device. For example, the windowing environment 100 may have a mouse-specific API, a mouse object class, and may pass mouse-specific messages 118 to applications 120, 122, and 124 (the windowing environment 100 may also pass other window messages 119, e.g., refresh, minimize, move, resize, close, etc.). The windowing environment 100 may also pass touch-specific messages to applications 120, 122, and 124. In short, applications 120, 122, and 124, if they are to operate for any of the input devices 104, 106, 108, 110, must have different code to handle the different types of inputs, even in cases where the different types of input devices have semantic similarities such as with pointer devices.

The windowing environment 100 may also include gesture recognition functionality, possibly passing gesture recognition messages 128 to applications 120, 122, 124. However, if applications 120, 122, 124 are to deal with raw input 126 they may need additional code for handling raw input messages 126 received from driver stacks 114. Such raw input 126 may be unusable with native gesture-recognition functionality provided by the windowing environment 100, thus possibly requiring an application to forego using gesture recognition functions provided by windowing environment 100 and instead, disadvantageously, include custom-written gesture recognition code.

Figure 2:
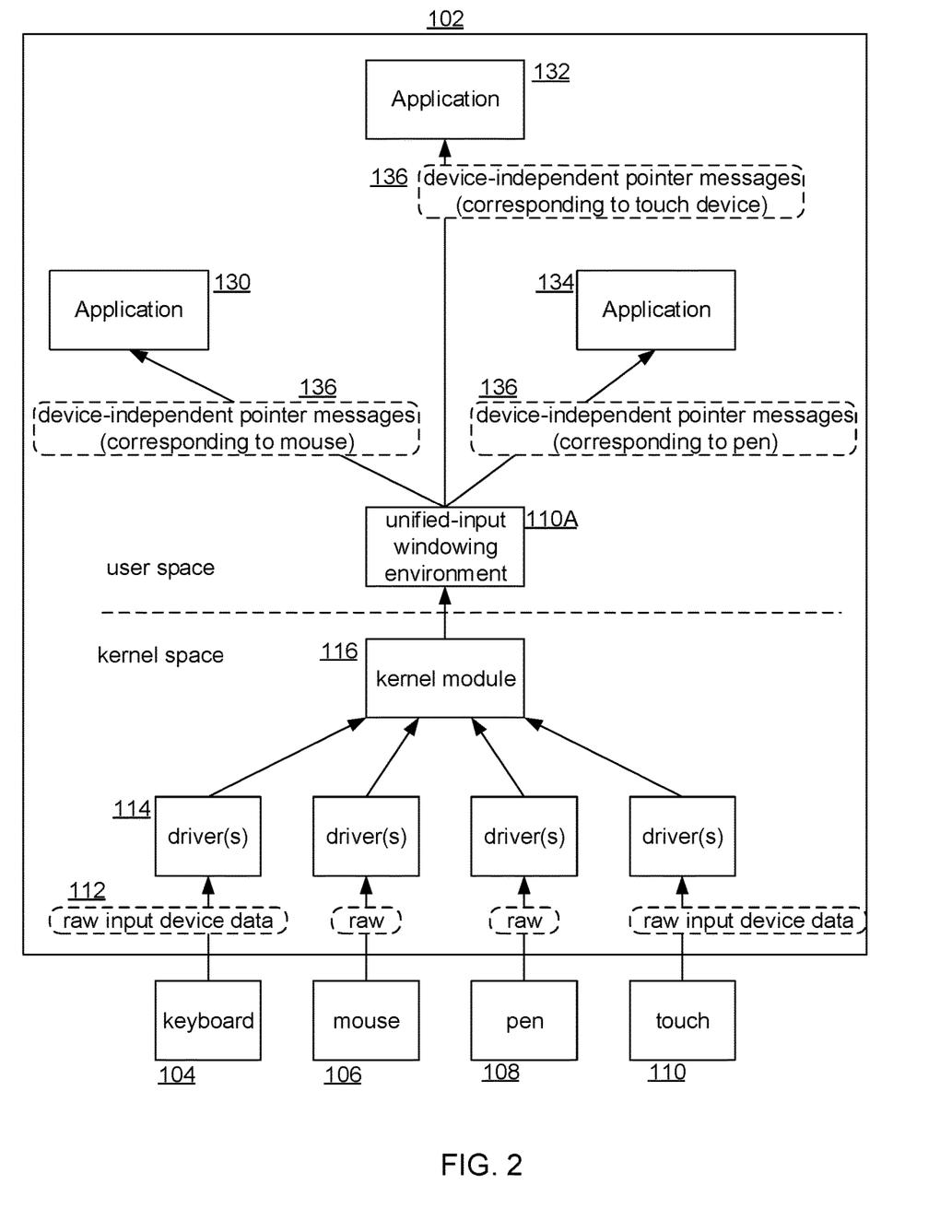
FIG. 2 shows the computing device with a unified-input windowing environment.

FIG. 2 shows the computing device 102 with a unified-input windowing environment 110A (any references to "windowing environment" hereafter will refer to the unified-input windowing environment 110A). The unified-input windowing environment 110A may receive input data passed up from driver stacks 114 according to input data from input devices 104, 106, 108, 110. The unified-input windowing environment 110A takes input generated from any pointer devices such as a mouse, a pen, a touch surface, or the like, and uses a common interface, messages, and data types (or classes) to communicate with applications 130, 132, 134. That is, regardless of the particular type of pointer device that was used by a user to provide interactive pointer input, the unified-input windowing environment 110A provides a unified set of constructs to allow the applications 130, 132, 134 to handle the input transparently without regard for the type of device used to provide the pointer input. Note that FIG. 2 is only an example configuration and in practice any application may receive inputs from any input device. Often, a user may swap between input devices while using a same application, and the inputs from those devices will be received by the application. For example, pointer messages 136 which are generally device-independent (or which may primarily carry device-independent input data) are sent to the applications 130, 132, 134 whether from a touch device, a pen device, a mouse, or other pointer device. In other words, as described in detail below, applications use the same code to handle pointer messages 136 for arbitrary types of pointer devices, for instance using the same data types (object classes), application programming interfaces (APIs), and other facilities that the unified-input windowing environment 110A may provide for applications to handle device-independent pointer messages 136, objects, events, and so forth.

Figure 3:
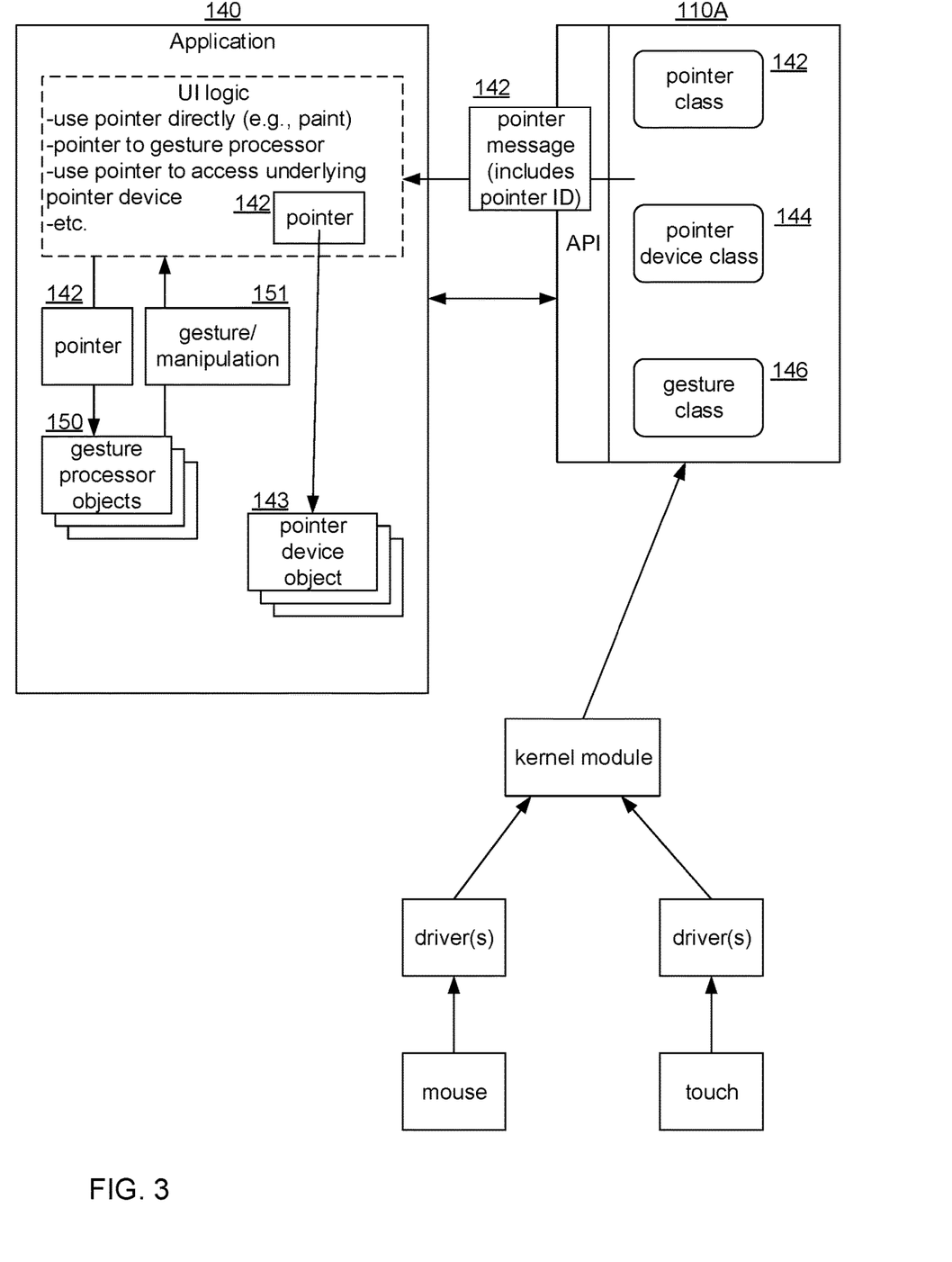
FIG. 3 shows an example of an application using the unified-input windowing environment.

FIG. 3 shows an example of an application 140 using the unified-input windowing environment 110A. The unified-input windowing environment 110A, in addition to managing arbitrary windows, may implement a pointer class 142, a pointer device class 144, and a gesture class 146. The application 140 may start by executing code to instantiate instances of the pointer class 142, the pointer device class 144, or the gesture class 146, as needed. The application 140 may also set up various event handlers to handle events and pointer messages 148 (as discussed below, embodiments may be implemented without object-oriented constructs). When a pointer message 148 (or event) is received, the UI logic of the application 140, for example, may use the pointer directly. For instance, if the application 140 has a painting area on which a user users an input pointer device to paint or draw, the application 140 may use x-y point data derived from the pointer message 148 to determine where to draw a stroke. If the logic of the application 140 requires information about the particular input pointer device that originated the pointer message 148, then the application 140 can use the pointer message 148 to obtain information such as what type of input device provided the input, what properties are supported by the input device, and so forth. For example, the pointer message 148 may have a property that is a pointer device object 143 for the corresponding pointing input device. As will be apparent when examples of classes are discussed below, the unified-input windowing environment 110A allows an application to deal with pointer inputs in a uniform manner and yet the application can go below the pointer inputs to access device-specific information when needed.

In addition, if the application 140 uses gestures, the pointer message 148 can be passed to an instance of a gesture processor 150 which may use information about the pointer message 148 (i.e., pointer input) to determine whether a gesture or manipulation has occurred. When a gesture or manipulation (e.g., an affine transformation) is identified, the gesture processor 150 in turn may signal the application 140 with an event or callback 151 indicating the identified gesture or manipulation.

While this description refers to classes, objects, event handlers, and other object-oriented constructs, these are only non-limiting examples used for convenience of explanation. Such examples are not to be taken as implying that any of the components or embodiments described herein are object-oriented or require an object-oriented environment. To the contrary, a windowing environment may well have no classes or other object-oriented constructs. Those skilled in the art of computer programming will appreciate that data structures, data types, messages, functions, and other non-object-oriented C-style constructs and APIs can be used with equal effect. Embodiments may also be implemented in simplified object-oriented environments such as Javascript™. Any use of "object" and "class" and related features such as methods and members will be understood, as used herein, as also describing implementations that use data structures and data types, functions, flat APIs, and the like, as the case may be. For example, the Win32™ module uses no classes per se. The companion User32™ module sends, for example, window messages (e.g., pointer messages) to applications, which in turn may process those messages using various associated functions. In sum, the embodiments described herein can be implemented in any type of programming environment using any type of programming language.

Figure 4:
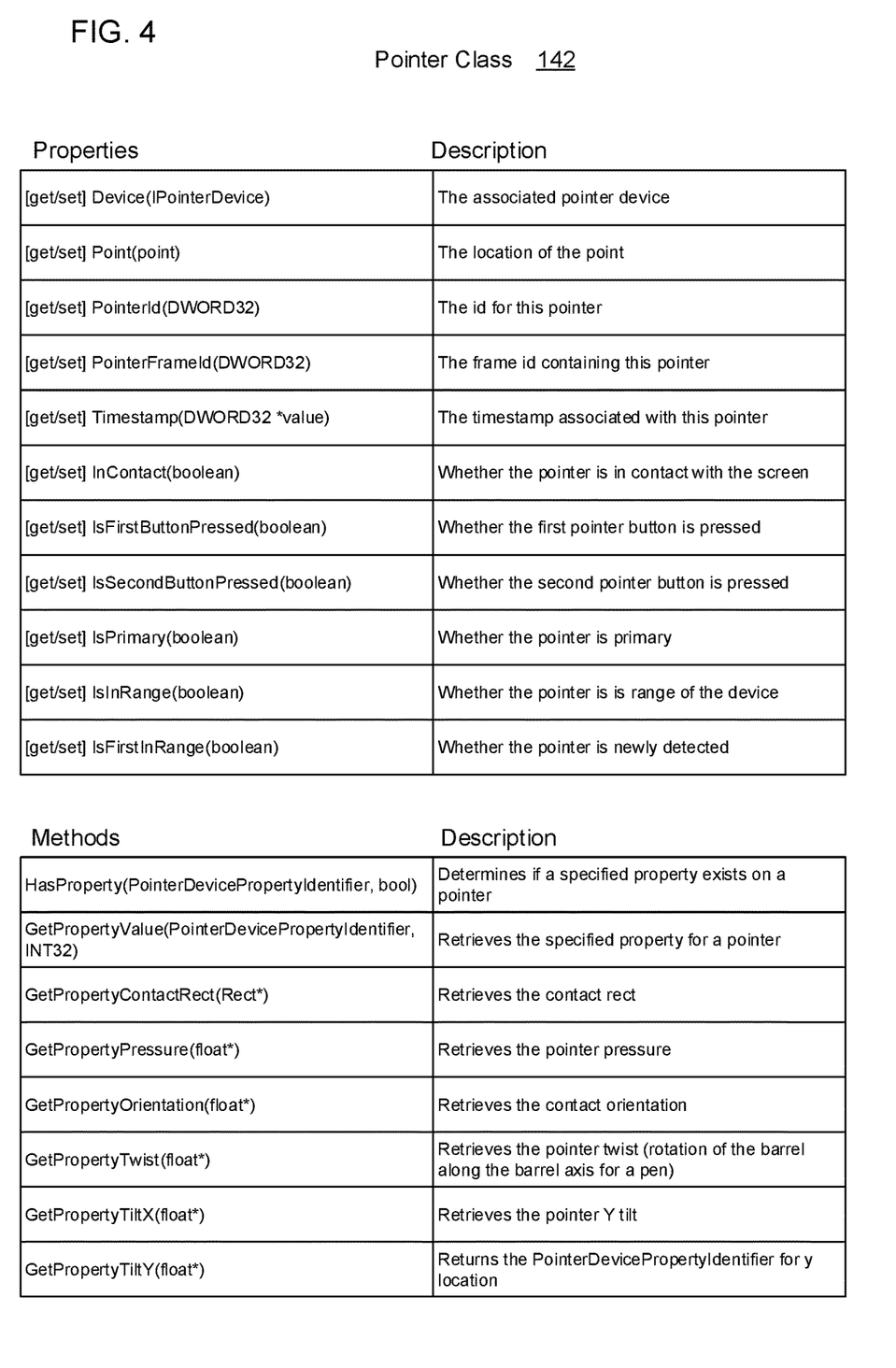
FIG. 4 shows an example of the pointer class.

FIG. 4 shows an example of the pointer class 142. The pointer class 142 may have properties and methods as described in the Figure. In one embodiment, object instances of the pointer class 160 are obtained when an application receives an event notification. For example, the unified-input windowing environment 110A may provide various events for the pointer class 142 that may correspond to concepts of up inputs, move inputs, down inputs, and others. The application's corresponding event handlers may receive a set of event arguments which may include a property or method for accessing the corresponding pointer object (an instance of the pointer class 142). The application may in turn access the pointer object associated with a pointer event or pointer message. Thus any of the properties or methods shown in FIG. 4 are available to the application when the application is notified of or receives a pointer input. Pointers may also be implemented to concurrently support different frameworks handing pointer data back in a variety of coordinate systems, depending on what frame of reference is most helpful to a developer. Common coordinate systems include a client client's coordinates (relative to the application's window), screen coordinates, or coordinates relative to an element receiving the event.

FIG. 5 shows an example gesture class 146. An application may instantiate objects of the gesture class 146, and the instantiated objects may then be used as gesture recognition engines to recognize gestures from one or more pointer inputs (these may also be known as software-based gesture processors). In one embodiment, sets or vectors of pointer inputs may be passed to a gesture recognizer object. Timestamps, locations (points) of the pointer inputs or points, contact geometry (shape of a contact) may be used by gesture recognition algorithms (possibly configured using methods or properties of the gesture recognizing objects). Not all pointer inputs passed to a gesture recognizing object will necessarily result in a gesture or manipulation being recognized. In some cases, a gesture is recognized based on a set of recent pointer inputs stored in a history of a gesture object and a corresponding event (e.g., tap, hold, or other recognized manipulation or gesture) is then generated for the host application to handle according to its user interface logic.

Regardless of the type of pointer input device used (e.g., pen, mouse, touch surface, or other), the same gesture handling code may be used by the application. In addition, if necessary, the application may access information about the device associated with a pointer input to handle the input in a device-specific manner.

Figure 6:
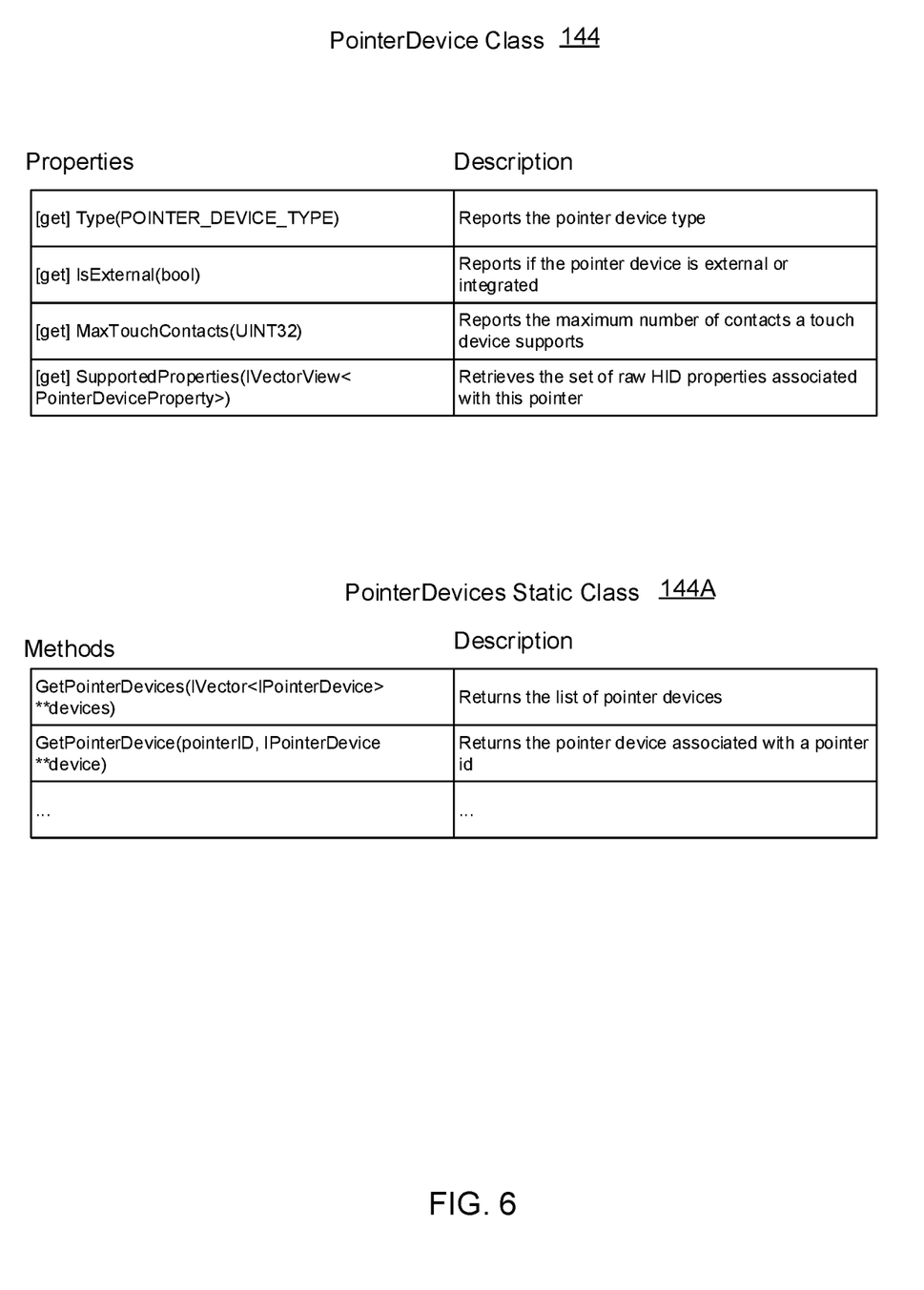
FIG. 6 shows an example of the pointer device class.

FIG. 6 shows an example of the pointer device class 144 for representing pointer devices. A pointer device object instance of the pointer device class 144 can be accessed by enumerating through the attached pointer devices using a method of a static pointer device class 144A. Or, a pointer device object can be accessed using a method or property of a pointer input object. In yet another embodiment, a pointer device object can be accessed by passing a pointer input identifier (see PointerId in FIG. 4) to the GetPointerDevice method of the static pointer class 144A.

As mentioned above, it may be desirable to provide the pointer class 142 with a property or field indicating whether a pointer is deemed to be a primary pointer. Various heuristics or rules may be used to determine whether a pointer device's input is primary. For example, a mouse device's inputs may always be considered primary to the exclusion of other device inputs. When multiple concurrent touches are presented by a touch input device, inputs from a first contact point may be given primary status. If a primary touch input is lifted and a second touch input remains down, even though a state is reached where there is not a current primary input, it is not until all touch contacts are determined to have ended (e.g., the second touch is lifted) that another new initial contact can become a new primary input. Note that the concept of a primary pointer can be tied to which input gets promoted to a legacy mouse construct, as described below.

In some cases so-called legacy applications that are not coded to work with the above-described pointer input model may nonetheless execute with the unified-input windowing environment 110A. In one embodiment, the unified-input windowing environment 110A probes a new application to determine if the application will recognize messages for the pointer input model, for instance sending unified-device messages. If an error occurs or there is no response, the unified-input windowing environment 110A may translate the pointer inputs into traditional mouse messages as described with reference to FIG. 1 (e.g., mouse events, mouse-specific objects, etc.). It is also possible that the application may have an environment setting that allows the unified-input windowing environment 110A to explicitly determine whether the application is a legacy application that cannot understand the unified pointer input model, which may also be mitigated by translating to older input formats that are suitable to the application (when such an environment setting is detected, probing may be avoided). When translation occurs, the primary property may be used to identify which inputs are to be mouse inputs; other inputs may be handled as raw input or in other ways.

Figure 7:
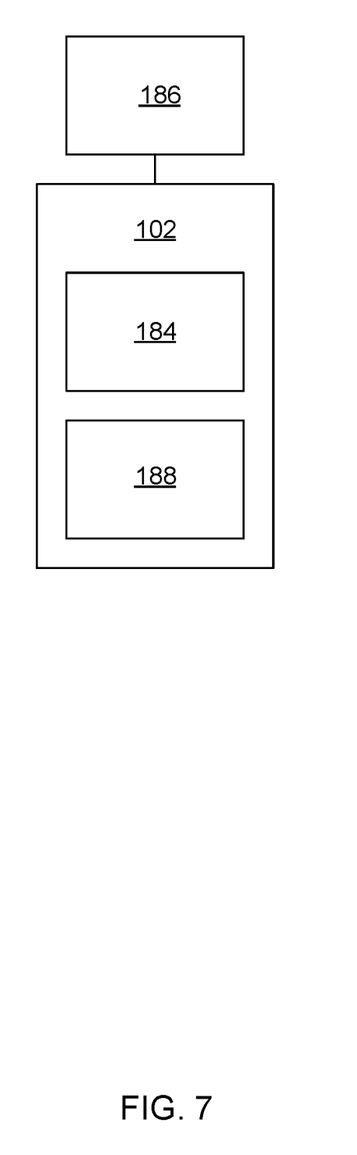
FIG. 7 shows additional details of the computing device.

FIG. 7 shows additional details of the computing device 102. The computing device 102 may be of any form such as a personal computer, a laptop computer, a workstation or server, a mobile device, smart phone, tablet, or the like. The computing device 102 may have physical storage 184 which may be static and/or volatile memory, magnetic or optical media, one or more hard disk drives, or a combination thereof. The computing device 102 may also have a display 186, either integrated with or connected with the computing device 102. The computing device 102 may also have any of a variety of processors 188 that cooperates with the storage 184 to implement embodiments described above.

CONCLUSION

As mentioned, embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any other means of storing digital information in a way that is convenient for use by a computer, but excluding signals and energy per se. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed.

The invention claimed is:

1. A method of managing pointer devices performed by an operating system executing on a computer, the operating system managing windows of applications executing on the computer, the operating system configured to manage a plurality of types of pointer devices, the method comprising:

providing pointer messages from the operating system to the applications, the pointer messages comprising respective instances of a generic message type implemented by the operating system, the generic message type defining a point element and a pointer device-type element, wherein the generic message type is generic with respect to each of the types of pointer devices, wherein each of the pointer messages comprises a respective point value in its point element and, in the pointer device-type element, a pointer device-type identifier that identifies a pointer device-type of a pointer input device that sensed a point corresponding to the point value therein;

generating a first pointer message responsive to receiving a corresponding first point sensed by a first pointer device connected and/or integrated with the computer, and, based on the first point, forming the first pointer message by including therein a first point value derived by the operating system from the first point and by setting the pointer device-type element of the first pointer message to indicate a first pointer device-type that corresponds to the first pointer device;

generating a second pointer message responsive to receiving a corresponding second point sensed by a second pointer device connected and/or integrated with the computer, and, based on the second point, forming the second pointer message by including therein a second point valued derived by the operating system from the second point and by setting the pointer device-type element of the second pointer message to indicate a second pointer device-type that corresponds to the second pointer device; and passing, by the operating system, to one of the applications, the first and second pointer messages respectively corresponding to the first and second input points.

2. A method according to claim 1, wherein the operating system maps input points of any arbitrary type of pointer device to pointer messages that are instances of the generic pointer message type such that an application coded to handle pointer messages is able to receive input from the plurality of types of pointer devices via such pointer messages.

3. A method according to claim 1, wherein the first pointer device-type is a mouse device type, wherein the second device-type is a touch device-type, wherein the first pointer device comprises a mouse, and wherein the second pointer device comprises a touch-sensitive surface.

4. A method according to claim 3, wherein the generic pointer message type is used by the operating system to provide pointer messages that are instances of the generic pointer message type for arbitrary types of pointer devices connected with the computer.

5. A method according to claim 1, wherein the generic pointer message type defines a first input value type and a second input value type, wherein the first input value type is only provideable by pointer devices of the first pointer device-type, and wherein the second input value type is only provideable by pointer devices of the second pointer device-type.

6. A method according to claim 5, wherein the first input value type corresponds to a first quality of points sensed by pointer devices of the first pointer device-type and the second input value type corresponds to a second quality of points sensed by pointer devices of the second pointer device-type.

7. A method according to claim 6, wherein pointer devices of the first pointer device-type do not sense points with the second quality of points and pointer devices of the second pointer device-type do not sense points with the first quality of points.

8. Computer-readable storage hardware storing information to enable a computing device to perform a process, the computing device comprising a processor, a display, a first pointer device, and a second pointer device, where the first pointer device is in a first category of pointer devices and the second pointer device is in a second category of pointer devices, the process comprising:

executing an operating system that manages windows of applications executing on the computing device;

receiving, by the operating system, first raw input points sensed by the first pointer device and second raw input points sensed by the second pointer device;

generating, by the operating system, first input pointers comprised of points respectively corresponding to the first raw input points, and second input pointers respectively corresponding to the second raw input points, the first and second input pointers comprising instances of a same input pointer data type or a same message type implemented by the operating system, wherein the input pointer data type or message type is device-independent with respect to categories of pointer devices including at least the first and second categories of pointer devices, and wherein each input pointer comprises a category identifier identifying a category of pointer devices set according to a pointer device that sensed a corresponding raw input point, the input pointer data type or message type used by the operating system to convey points outputted by pointer devices of arbitrary different categories of pointer devices; and passing the input pointers to the applications.

9. Computer-readable storage hardware according to claim 8, wherein the first category of pointer devices corresponds to a first type of input point sensing and the second category of pointer devices corresponds to a second type of input point sensing.

10. Computer-readable storage hardware according to claim 8, wherein a first portion of the first pointers correspond to a first physical pointer being sensed by the first pointer device and a second portion of the first pointers correspond to a second physical pointer being sensed by the first pointer device.

11. Computer-readable storage hardware according to claim 10, the process further comprising determining which of the physical pointers is a primary input pointer, wherein the same input pointer data type or the same message type comprises a property or field configured to indicate whether an input pointer corresponds to the primary input pointer.

12. Computer-readable storage hardware according to claim 11, wherein the first pointer device comprises a touch-sensitive surface, the first and second physical pointers comprise respective digits.

13. Computer-readable storage hardware according to claim 8, wherein the same input pointer data type or the same message type defines a first set of fields or properties and a second set of fields or properties, wherein the first and second sets are partially intersecting sets such that the same input pointer data type or the same message type defines at least: one field or property that corresponds to input available only from the first category of pointer devices, one field or property that corresponds to input available only from the second category of pointer devices, and one field or property that corresponds to input available from both the first and second categories of pointer devices.

14. Computer-readable storage hardware according to claim 8, wherein the same input pointer data type or the same message type is configured to convey pointer inputs for any arbitrary categories of pointer devices.

15. Computer-readable storage hardware according to claim 8, the process further comprising receiving the first and second raw input points from device drivers of the first and second pointer devices, respectively.

16. A computing device comprising:

a processor, storage, display, and a first pointer input device, the computing device configured to connect with a second pointer input device of a pointer device category that is different than a pointer device category of the first pointer input device, each pointer input device configured to sense and generate input points;

the storage storing an operating system configured to receive and manage the input points and manage windows for arbitrary applications on the computing device, the operating system implementing a generic pointer message class configured to convey to applications corresponding pointer messages for at least the first and second pointer device categories, the generic pointer message class comprising pointer data properties that each correspond to a respective type of data provided by each pointer device in each category of pointer devices, the properties further including a pointer device category property; and the operating system further configured to, when executing by the processor, according to the input points generated by user physical manipulations directed to the first pointer input device and the second pointer input device, generate respective pointer messages that comprise instances of the generic pointer message class, each of the pointer messages having each of the pointer data properties which are populated with corresponding values that vary according to the corresponding physical manipulations of the first and second pointer input devices based on the input points, wherein each pointer message's pointer device category property indicates the pointer device category of the corresponding pointer input device, and wherein the operating system is configured to determine which pointer messages are passed to which windows managed by the operating system.

17. A computing device according to claim 16, wherein the pointer messages have a primary property indicating whether the respective pointer messages are primary pointer messages.

18. A computing device according to claim 17, wherein the operating system is configured to set the primary property by determining whether an input point was a first point in a sequence of input points.

19. A computing device according to claim 16, wherein the generic pointer message class comprises a timestamp element and wherein the generated pointer messages comprise respective timestamp values in their respective timestamp elements.

20. A computing device according to claim 16, wherein the generated pointer messages comprise respective elements configured to provide applications with access to details about whichever pointer input device inputted a corresponding pointer message.

* * * * *